United States Patent
Shin et al.

(10) Patent No.: US 12,294,106 B2
(45) Date of Patent: May 6, 2025

(54) BATTERY PACK AND DEVICE INCLUDING THE SAME

(71) Applicant: LG ENERGY SOLUTION, LTD., Seoul (KR)

(72) Inventors: Juhwan Shin, Daejeon (KR); Hyoungsuk Lee, Daejeon (KR); Donghyun Kim, Daejeon (KR); Byung Do Jang, Daejeon (KR); Yongho Chun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 504 days.

(21) Appl. No.: 17/767,234

(22) PCT Filed: Apr. 26, 2021

(86) PCT No.: PCT/KR2021/005271
§ 371 (c)(1),
(2) Date: Apr. 7, 2022

(87) PCT Pub. No.: WO2021/221415
PCT Pub. Date: Nov. 4, 2021

(65) Prior Publication Data
US 2022/0384905 A1    Dec. 1, 2022

(30) Foreign Application Priority Data
Apr. 29, 2020  (KR) ........................ 10-2020-0052260

(51) Int. Cl.
*H01M 50/342* (2021.01)
*H01M 50/211* (2021.01)

(52) U.S. Cl.
CPC ....... *H01M 50/342* (2021.01); *H01M 50/211* (2021.01); *H01M 2220/20* (2013.01)

(58) Field of Classification Search
CPC ............................ H01M 50/35; H01M 50/367
See application file for complete search history.

(56) References Cited

U.S. PATENT DOCUMENTS

| 7,892,666 B2 * | 2/2011 | Nakano | H01M 10/6557 429/83 |
| 8,652,669 B2 * | 2/2014 | Nakayama | H01M 50/308 429/177 |

(Continued)

FOREIGN PATENT DOCUMENTS

| CN | 110165113 A | 8/2019 |
| CN | 110190211 A | 8/2019 |

(Continued)

OTHER PUBLICATIONS

International Search Report (PCT/ISA/210) issued in PCT/KR2021/005271, dated Jul. 29, 2021.

(Continued)

*Primary Examiner* — Amanda C. Walke
(74) *Attorney, Agent, or Firm* — Birch, Stewart, Kolasch & Birch, LLP

(57) ABSTRACT

A battery pack includes a plurality of battery modules; a venting guiding frame disposed along an edge of the plurality of battery modules; and a housing which accommodates the plurality of battery modules and the venting guiding frame, in which the battery module includes a battery cell stack in which the plurality of battery cells is stacked and a module frame accommodating the battery, cell stack, and the battery cell includes an electrode assembly and a cell case accommodating the electrode assembly, sealing portions are formed at an edge of the cell case, and at least one venting guiding part having a smaller width than an average width of the sealing portions is formed in the sealing portion.

12 Claims, 10 Drawing Sheets

(56) References Cited

U.S. PATENT DOCUMENTS

| | | | |
|---|---|---|---|
| 10,333,122 B2* | 6/2019 | Miyawaki | H01M 50/291 |
| 10,629,879 B2* | 4/2020 | Qin | H01M 50/325 |
| 11,335,970 B2* | 5/2022 | Kwon | H01M 50/35 |
| 2012/0164490 A1 | 6/2012 | Itoi et al. | |
| 2012/0288738 A1 | 11/2012 | Yasui et al. | |
| 2014/0113167 A1 | 4/2014 | Itoi et al. | |
| 2015/0064514 A1 | 3/2015 | Wu et al. | |
| 2015/0140369 A1 | 5/2015 | Itoi et al. | |
| 2017/0012330 A1 | 1/2017 | Kim et al. | |
| 2017/0331089 A1 | 11/2017 | Hashimoto et al. | |
| 2018/0108892 A1 | 4/2018 | Kim et al. | |
| 2018/0254444 A1 | 9/2018 | Yoon et al. | |
| 2021/0175572 A1 | 6/2021 | He et al. | |
| 2022/0059901 A1 | 2/2022 | Ren et al. | |

FOREIGN PATENT DOCUMENTS

| | | | | |
|---|---|---|---|---|
| CN | 110379963 A | | 10/2019 | |
| CN | 115995642 A * | | 4/2023 | H01M 50/103 |
| EP | 2 506 336 A1 | | 10/2012 | |
| JP | 2012-79510 A | | 4/2012 | |
| JP | 5420064 B2 | | 2/2014 | |
| JP | 2016-534518 A | | 11/2016 | |
| JP | 6376273 B2 | | 6/2018 | |
| JP | 2018-527704 A | | 1/2025 | |
| KR | 10-2012-0090027 A | | 8/2012 | |
| KR | 10-2014-0002115 A | | 1/2014 | |
| KR | 10-2014-0055641 A | | 5/2014 | |
| KR | 10-2015-0099965 A | | 9/2015 | |
| KR | 10-2016-0111614 A | | 9/2016 | |
| KR | 10-2017-0003754 A | | 1/2017 | |
| KR | 10-2017-0047687 A | | 8/2017 | |
| WO | WO 2014/003474 A1 | | 1/2014 | |
| WO | WO-2019203460 A1 * | | 10/2019 | H01M 10/425 |
| WO | WO 2016/132404 A1 | | 1/2025 | |

OTHER PUBLICATIONS

Extended European Search Report for European Application No. 21795499.9, dated Nov. 22, 2023.

* cited by examiner

【Figure 1】
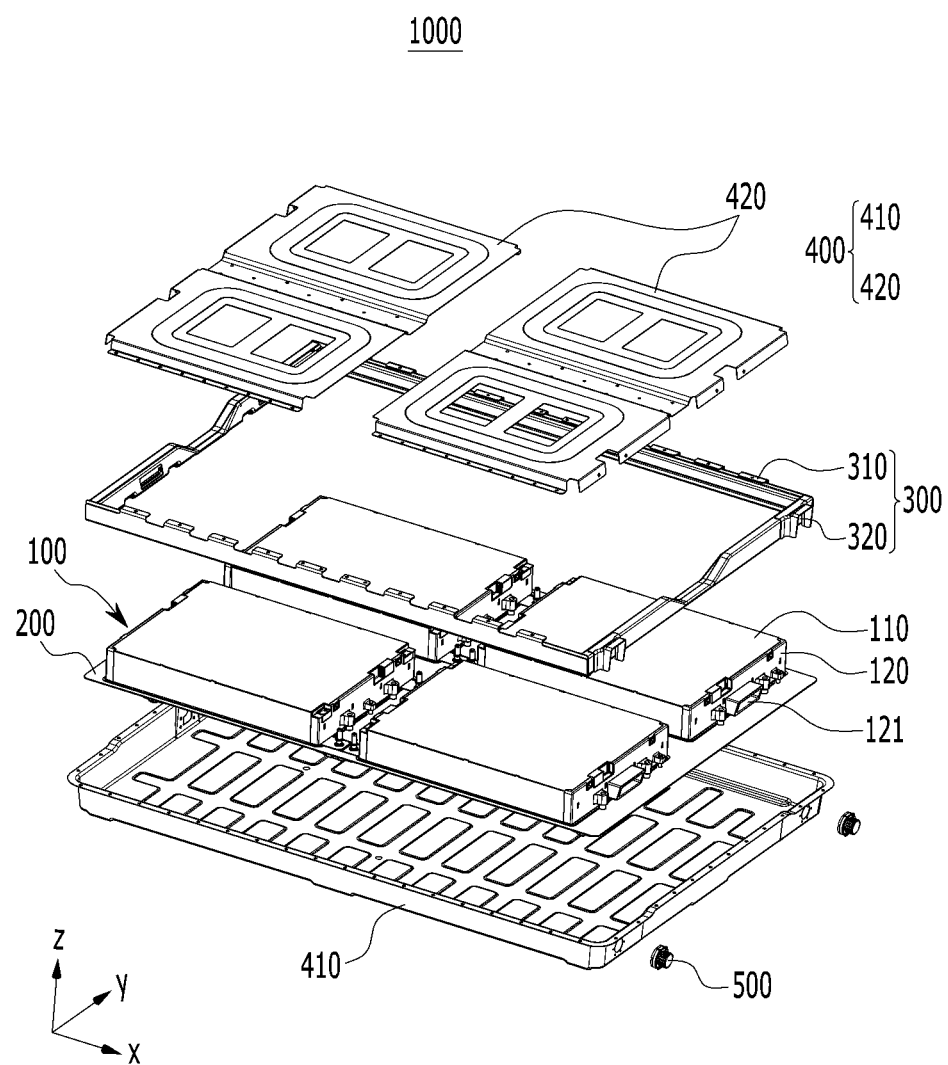

【Figure 2】
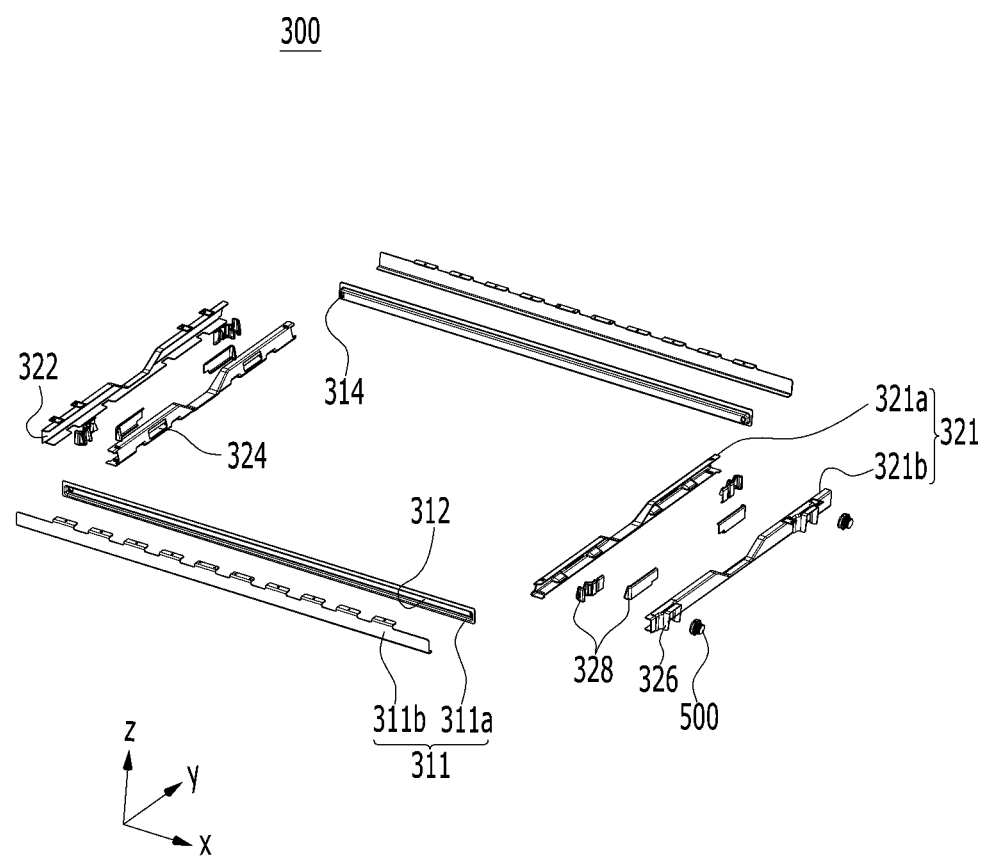

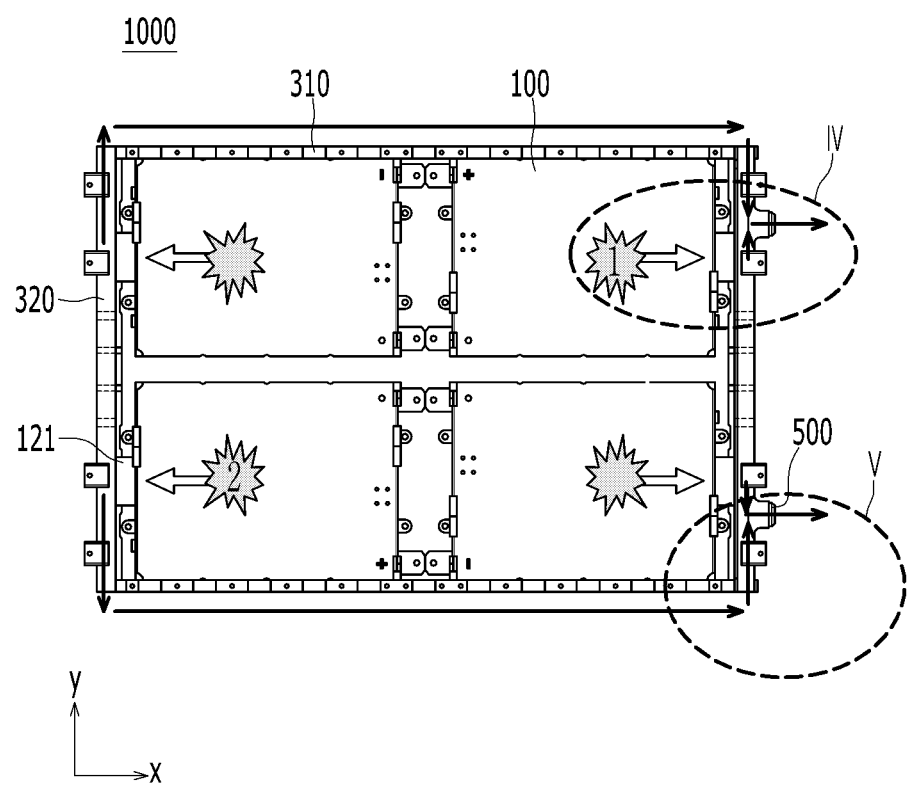
[Figure 3]

【Figure 4】
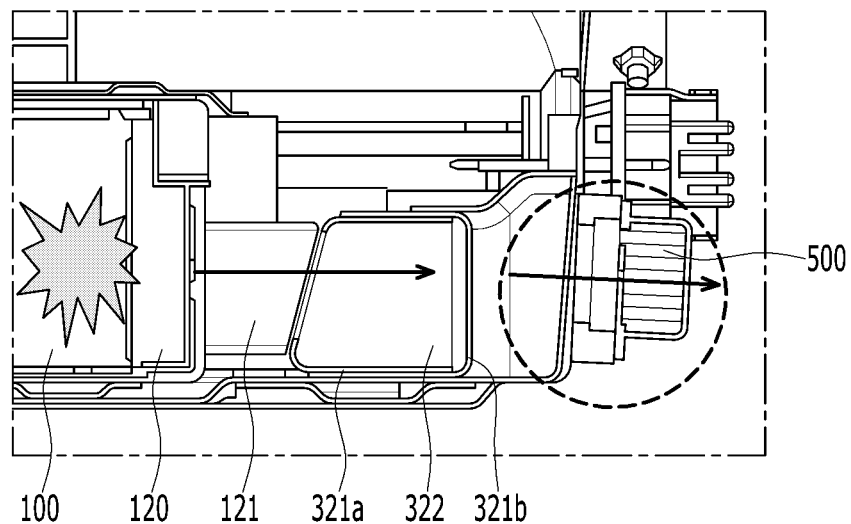
【Figure 5a】
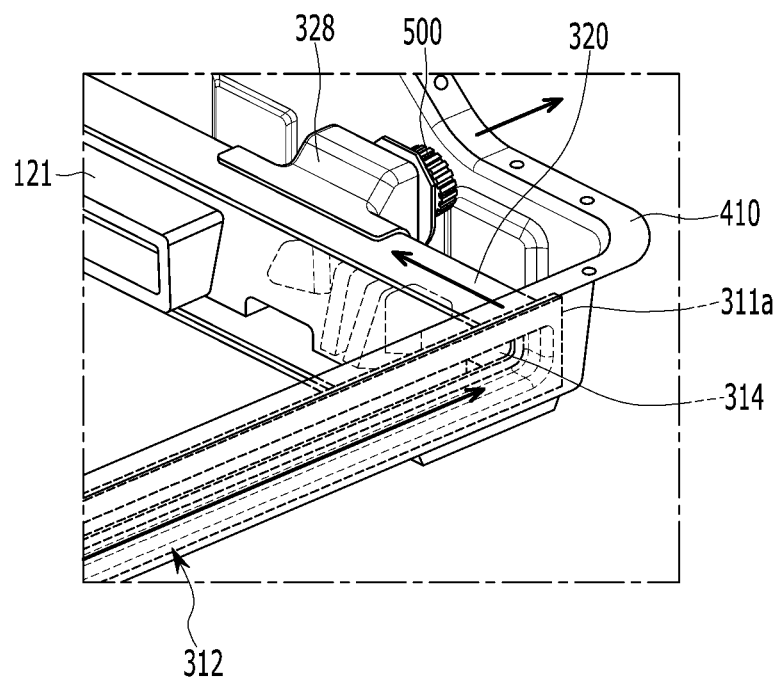

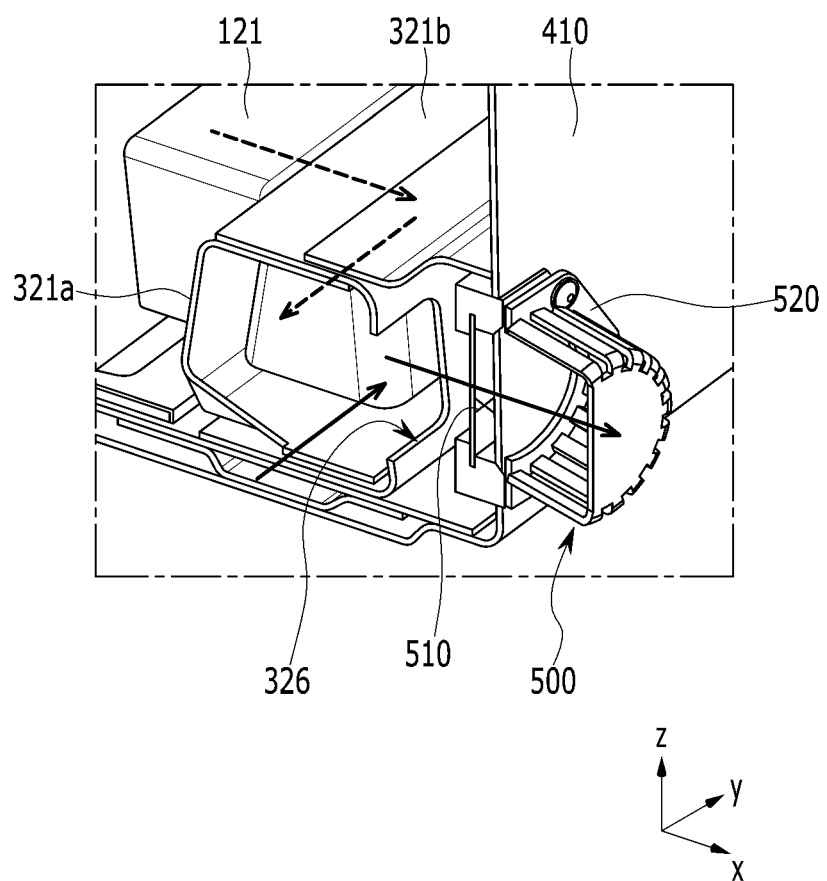
[Figure 5b]

[Figure 6]
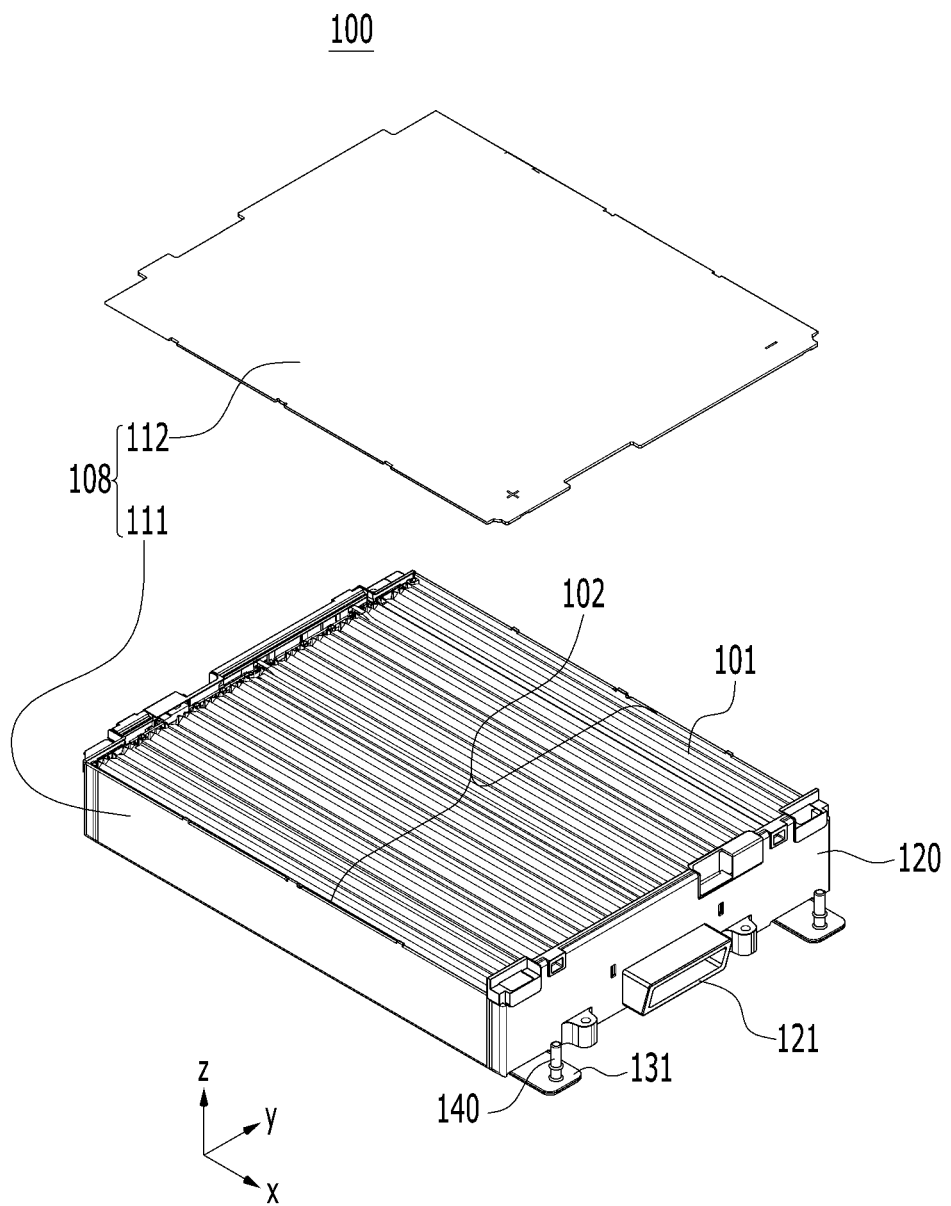

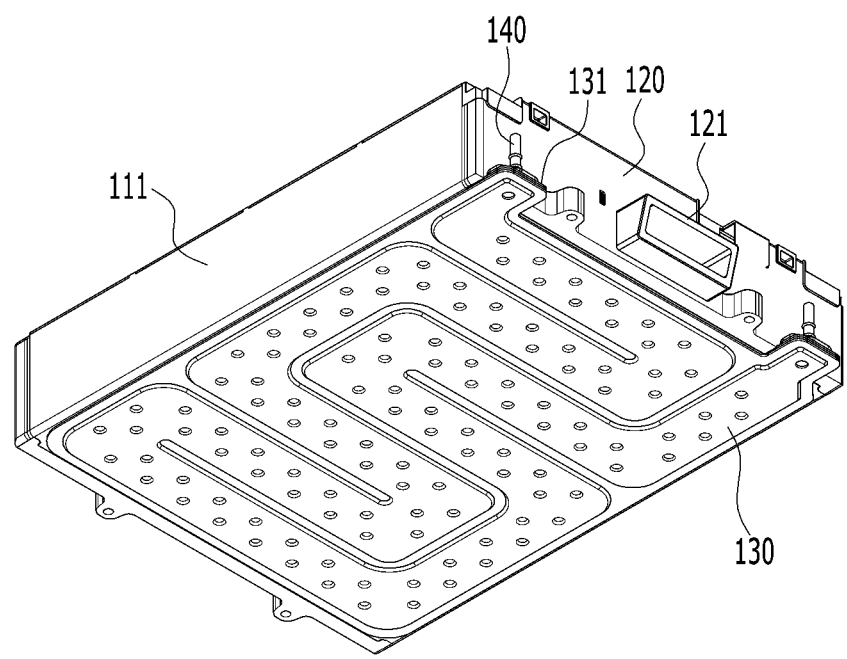
【Figure 7】

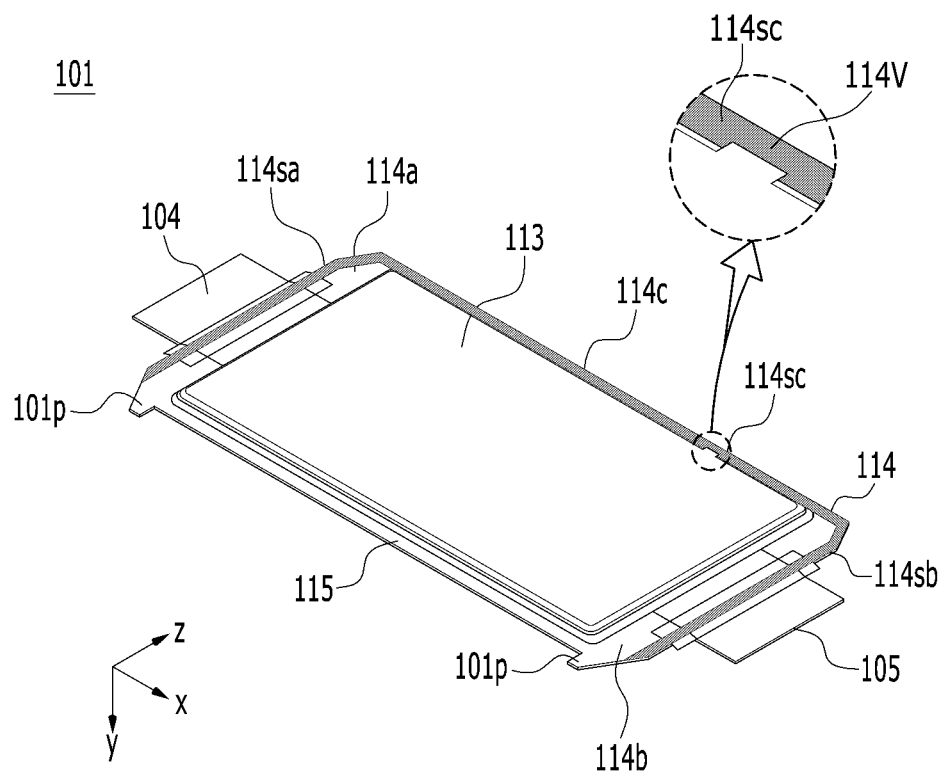
[Figure 8]

[Figure 9]
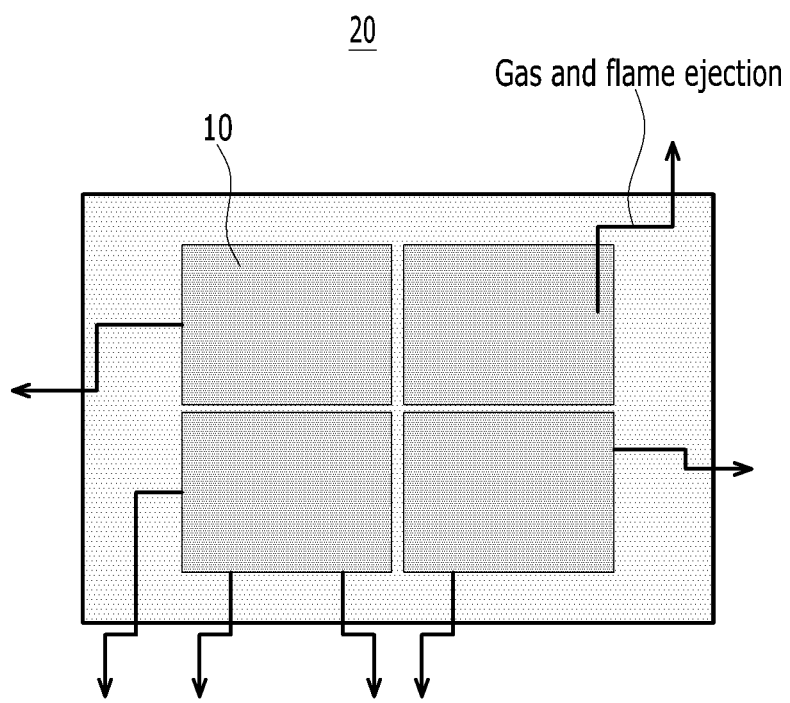

[Figure 10]
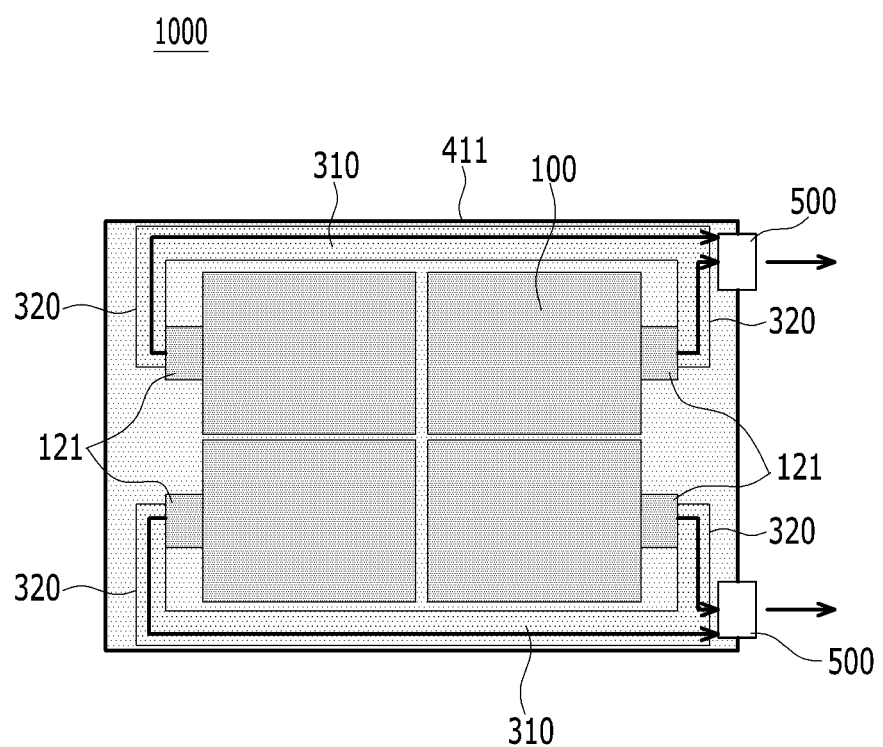

BATTERY PACK AND DEVICE INCLUDING THE SAME

CROSS-REFERENCE TO RELATED APPLICATION

This application claims priority to and the benefit of Korean Patent Application No. 10-2020-0052260 filed in the Korean Intellectual Property Office on Apr. 29, 2020, the entire contents of which are incorporated herein by reference.

TECHNICAL FIELD

The present invention relates to a battery pack and a device including the same, and more particularly, to a battery pack with improved safety and a device including the same.

BACKGROUND ART

A secondary battery, which is easy to apply according to product groups and has electrical characteristic, such as high energy density, is universally applied to electric vehicles or hybrid vehicles driven by an electric drive source, power storage devices, and the like, as well as portable devices. The secondary battery is attracting attention as a new energy source for enhancing eco-friendliness and energy efficiency in that the secondary battery does not generate any by-products from the use of energy, as well as the primary advantage of dramatically reducing the use of fossil fuels.

Currently commercialized secondary batteries include nickel cadmium batteries, nickel hydride batteries, nickel zinc batteries, lithium secondary batteries, and the like, and among them, the lithium secondary battery is in the spotlight for its advantages in that charge and discharge are free because a memory effect is little, a self-discharge rate is very low, and energy density is very high, compared to the nickel-based secondary battery.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate, to which the positive electrode active material and the negative electrode active material are applied, respectively, are disposed with a separator interposed therebetween, and an exterior material, that is, a battery case, that seals and accommodates the electrode assembly together with an electrolyte.

In general, the lithium secondary battery may be classified into a can-type secondary battery in which the electrode assembly is embedded in a metal can, and a pouch-type secondary battery in which the electrode assembly is embedded in a pouch of an aluminum laminate sheet, according to a shape of the exterior material.

Recently, as the need for a high-capacity secondary battery structure, including the use of secondary battery as an energy storage source, increases, the demand for a battery pack having a medium-to-large module structure in which battery modules in which a plurality of secondary batteries is connected in series or in parallel are connected is increasing. In the battery module, the plurality of battery cells is connected to each other in series or in parallel to form a battery cell stack, so that capacity and output are improved. Further, the plurality of battery modules may be mounted together with various control and protection systems, such as a Battery Management System (BMS) and a cooling system, to form a battery pack.

The battery pack has the structure in which the plurality of battery modules is combined, so that when some battery modules have overvoltage, overcurrent, or overheat, battery pack safety and operating efficiency may be problematic. Particularly, in order to improve the travelling distance, the capacity of the battery pack is gradually increasing, and as a result, the internal energy of the battery pack is also increased, so that it is necessary to design a structure to satisfy the strengthen safety standards and to secure the safety of a vehicle and a driver. To this end, there emerges the need for a structure capable of preventing internal thermal runaway and the like in advance and minimizing the damage even when the thermal runaway occurs.

DISCLOSURE

Technical Problem

The present invention has been made in an effort to provide a battery pack with improved safety and a device including the same.

However, the problem to be solved in the exemplary embodiments of the present invention is not limited to the foregoing problem, and may be variously extended in the scope of the technical spirit included in the present invention.

Technical Solution

An exemplary embodiment of the present invention provides a battery pack, including: a plurality of battery modules; a venting guiding frame disposed along an edge of the plurality of battery modules; and a housing which accommodates the plurality of battery modules and the venting guiding frame, in which the battery module includes a battery cell stack in which the plurality of battery cells is stacked and a module frame accommodating the battery cell stack, and each battery cell of the plurality of battery cells includes an electrode assembly and a cell case accommodating the electrode assembly, a sealing portion is formed at an edge of the cell case, and at least one venting guide having a smaller width than an average width of the sealing portion is formed in the sealing portion.

The battery module may further include: end plates which respectively cover the battery cell stack exposed from a front surface and a rear surface of the module frame; and at least one venting gate communicating with an inside of the battery module in the end plate.

The venting guide may be formed to be adjacent to the venting gate.

The venting guiding frame may include one pair of vertical beams formed to be parallel to a first direction and one pair of horizontal beams formed to be parallel to a second direction crossing the first direction, and each of the vertical beams and the horizontal beams may have a tubular shape and include a cover formed in a longitudinal direction of the vertical beam and the horizontal beam, and a passage surrounded by the cover to allow gas to pass through.

The cover of the horizontal beam may include at least one first connection hole facing the battery module, and the venting gate may be formed so that a tubular shape of the venting gate communicates with a tubular shape of the horizontal beam while facing the first connection hole.

A second connection hole communicating with a passage of the other of the vertical beam and the horizontal beam may be provided in the cover of any one of the vertical beam and the horizontal beam.

The battery pack may further include at least one rupture part connected with the passage at an external side of any one of the horizontal beam and the vertical beam.

The venting gate, the first connection hole, the passage of the horizontal beam, and the second connection hole, and the passage of the vertical beam may be connected by one path.

The housing may include a lower housing including a bottom surface on which the plurality of battery modules is disposed and a lateral wall extended upwards from the bottom surface, and an upper cover covering an opening of an upper portion of the lower housing, and the rupture part may be coupled with the horizontal beam or the vertical beam with the lateral wall of the lower housing interposed therebetween.

Another exemplary embodiment of the present invention provides a device including the battery pack.

Advantageous Effects

According to the exemplary embodiment, the venting guiding structure is formed inside the battery pack, so that it is possible to improve safety of the battery pack by guiding venting gas in a predetermined direction when an abnormal phenomenon occurs in the battery cell.

DESCRIPTION OF THE DRAWINGS

FIG. 1 is an exploded perspective view illustrating a battery pack according to an exemplary embodiment of the present invention.

FIG. 2 is an exploded perspective view of a venting guiding frame in the battery pack of FIG. 1.

FIG. 3 is a diagram schematically illustrating a transfer path when thermal runaway occurs in some modules of the battery pack according to the exemplary embodiment of the present invention.

FIG. 4 is an enlarged view of portion IV of FIG. 3.

FIG. 5a and FIG. 5b are enlarged views of portion V of FIG. 3.

FIG. 6 is a perspective view illustrating a battery module included in the battery pack of FIG. 1.

FIG. 7 is a perspective view of the battery module of FIG. 6 viewed from the bottom up in a z-axis direction.

FIG. 8 is a perspective view of a battery cell included in the battery module of FIG. 6.

FIG. 9 is a schematic diagram illustrating a flow of venting gas when an abnormal phenomenon occurs in a battery pack according to a comparative example.

FIG. 10 is a schematic diagram illustrating a flow of venting gas when an abnormal phenomenon occurs in the battery pack according to the exemplary embodiment of the present invention.

MODE FOR INVENTION

In the following detailed description, only certain exemplary embodiments of the present invention have been shown and described, simply by way of illustration. However, the present invention can be variously implemented and is not limited to the following embodiments.

Accordingly, the drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present invention is not limited thereto. In the drawings, the thickness of layers, films, panels, regions, etc., are exaggerated for clarity. In the drawings, for understanding and ease of description, the thickness of some layers and areas is exaggerated.

Further, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is "on" a reference portion, the element is located above or below the reference portion, and it does not necessarily mean that the element is located "on" in a direction opposite to gravity.

In addition, unless explicitly described to the contrary, the word "comprise", and variations such as "comprises" or "comprising", will be understood to imply the inclusion of stated elements but not the exclusion of any other elements.

Further, in the entire specification, when it is referred to as "on a plane", it means when a target part is viewed from above, and when it is referred to as "on a cross-section", it means when the cross-section obtained by cutting a target part vertically is viewed from the side.

FIG. 1 is an exploded perspective view illustrating a battery pack according to an exemplary embodiment of the present invention.

Referring to FIG. 1, a battery pack 1000 according to an exemplary embodiment of the present invention includes a plurality of battery modules 100, and a venting guiding frame 300 disposed along an edge of the plurality of battery modules 100

The plurality of battery modules 100 and the venting guiding frame 300 may be mounted onto a pack tray 200 and be accommodated in a pack housing 400. The pack housing 400 may include a lower housing 410 accommodating the pack tray 200, and an upper cover 420 coupled to the lower housing 410 to cover an upper portion of the battery modules 100.

Each of the plurality of battery module 100 includes a battery cell stack (not illustrated) disposed in the module frame 110, and includes end plates 120 covering the battery cell stack exposed to both ends of the module frame 110. In this case, any one of both end plates 120 includes a venting gate 121 which communicates with an inside of the battery module 100 and is capable of discharging flame or heat generable inside the battery module 100. In the battery pack 1000, the venting gate 121 is disposed so as to face an external side of the battery pack 1000, and preferably, as illustrated in FIG. 1, the venting gate 121 may be disposed so as to face the external side toward both end in a first direction (x-axis direction) in the battery pack 1000.

The venting guiding frame 300 may be disposed along the edge of the entire battery modules 100. The venting guiding frame 300 is formed in a tubular shape along each side of the battery pack 1000, and may include one pair of vertical beams 310 and one pair of horizontal beams 320 extended in the first direction (x-axis direction) and a second direction (y-axis direction), respectively, which are formed to be able to communicate as a whole. The detailed configuration of the venting guiding frame 300 will be described below. The plurality of battery module 100 and the venting guiding frame 300 may be mounted onto the pack tray 200, and may be fixed to the pack tray 200 by a fixing means as needed. The battery module 100, the venting guiding frame 300, and the pack tray 200 may be accommodated within the lower housing 410. The lower housing 410 may include a bottom surface on which the pack tray 200 is disposed, and a lateral wall extended upwards from an edge of the bottom surface. The upper cover 420 covering the upper portion of the battery module 100 is coupled to the lower housing 410 to protect an internal electric component. In this case, various control and protection systems, such as a Battery Management System (BMS) and a cooling system may be mounted in the pack housing 400 together with the battery module 100.

On one lateral wall of the lower housing 410, at least one rupture part 500 capable of discharging heat or flame generated inside to the outside may be formed. The detailed configuration of the rupture part 500 will be described below.

Hereinafter, the venting guiding frame of the battery pack according to the exemplary embodiment of the present invention will be described in more detail.

FIG. 2 is an exploded perspective view of the venting guiding frame in the battery pack of FIG. 1.

Referring to FIGS. 1 and 2, the venting guiding frame 300 is formed in a tubular shape along each side of the battery pack 1000, and may include one pair of vertical beams 310 and one pair of horizontal beams 320 extended in the first direction (x-axis direction) and the second direction (y-axis direction), respectively, which are formed to be able to communicate as a whole.

The vertical beam 310 has a tubular shape elongated in the first direction (x-axis direction), and in this case, the vertical beam 310 includes a cover 311 defining an internal side of the tubular shape and a passage 312 formed inside the cover 311. The cover 311 may include a first internal cover 311a disposed while being adjacent to the battery module 100 in the second direction (y-axis direction), and a first external cover 311b disposed on the side away from the battery module 100 in the second direction (y-axis direction) while facing the first internal cover 311a. At least one of the first internal cover 311a and the first external cover 311b includes a groove elongated in the first direction. That is, at least one of the first internal cover 311a and the first external cover 311b is formed to have a cross-section shaped like "⊏" (formed in a shape in which one surface is removed from a square tubular shape), so that a passage 312 may be defined by coupling the other cover to the one cover. However, the present invention is not limited thereto, and it is not particularly limited as long as a tubular shape can be obtained by the cover 311.

The horizontal beam 320 has a tubular shape elongated in the second direction (y-axis direction), and in this case, the horizontal beam 320 includes a cover 321 defining an internal side of the tubular shape, and a passage 322 formed inside the cover 321. The cover 321 may include a second internal cover 321a disposed while being adjacent to the battery module 100 in the first direction (x-axis direction), and a second external cover 321b disposed on the side away from the battery module 100 in the first direction (x-axis direction) while facing the second internal cover 321a. At least one of the second internal cover 321a and the second external cover 321b includes a groove elongated in the second direction. That is, at least one of the second internal cover 321a and the second external cover 321b is formed to have a cross-section shaped like "⊏" (formed in a shape in which one surface is removed from a square tubular shape), so that a passage 322 may be defined by coupling the other cover to the one cover.

Particularly, in the present exemplary embodiment, when both the second internal cover 321a and the second external cover 321b are formed to have the cross-sections shaped like "⊏" as illustrated in FIG. 2, thereby, it is possible to improve strength when the horizontal beam 320 is assembled. However, the present invention is not limited thereto, and it is not particularly limited as long as a tubular shape can be obtained by the cover 321.

The horizontal beam 320 includes a first connection hole 324 formed in the surface facing the battery module 100, that is, one surface of the second internal cover 321a. The first connection hole 324 is disposed to communicate with the venting gate 121 of the battery module 100. Further, the horizontal beam 320 further includes a third connection hole 326 formed on the surface disposed in the direction far from the battery module 100 in the first direction, that is, one surface of the second external cover 321b. The third connection hole 326 is disposed so that the rupture part 500 communicates with the passage 322. In this case, in order to guide a path in which the venting gate 121, the passage 322 of the horizontal beam 320, and the rupture part 500 communicate, the rupture part 500 may be coupled to the horizontal beam 320 through a venting path bracket 328.

The vertical beam 310 includes second connection holes 314 formed in the first internal cover 311a at both ends adjacent to the horizontal beam 320. By the second connection hole 314, the passage 322 of the horizontal beam 320 may communicate with the passage 312 of the vertical beam 310.

The rupture part 500 is connected with the passage 322 of the horizontal beam 320, and includes a rupture surface 510 (illustrated in FIG. 5b) configured to be ruptured when a pressure of introduced gas is equal to or larger than a predetermined pressure. Further, the rupture part 500 includes a wing part 520 (illustrated in FIG. 5b) protruding from a main body formed with the rupture surface 510 and configured to be coupled with the lateral wall of the lower housing 410. The wing part 520 may be fixed to the lower housing 410 through a fastening means, such as a screw.

In the present exemplary embodiment, the rupture part 500 is connected with the passage 322 of the horizontal beam 320 and further, the rupture part 500 is fixed with the horizontal beam 320 with the lower housing 410 interposed therebetween, but the present invention is not limited thereto, and if a configuration communicates with the passage of the venting guiding frame 300 and is capable of discharging the gas to the outside, the configuration may be appropriately adopted. Further, in the present exemplary embodiment, it is exemplified that two rupture parts 500 are formed at any one of one pair of horizontal beams 320, but the present invention is not limited thereto, and the rupture part 500 may be provided to the other horizontal beam 320 or may also be provided to the vertical beam 310, and the position of the rupture part 500 and the number of rupture parts 500 may be appropriately selected as necessary.

By the foregoing configuration, the passage is formed to communicate as a whole inside the square venting guiding frame 300 formed of the vertical beams 310 and the horizontal beams 320, and the passage communicates with the venting gate 121 and the rupture part 500 of the battery module 100, so that when thermal runaway and the like occurs from the battery module 100, the passage guides heat and flame to the outside, thereby minimizing an influence on the surrounding battery modules. In this case, the flame included in the generated high-pressure venting gas is completely combusted while passing through the path inside the venting guiding frame 300, thereby being discharged to the outside in a safer state. Further, the venting guiding frame 300 acts as a support frame stably supporting the battery module 100 normally, not during thermal runaway, thereby improving safety of the battery pack 1000.

Hereinafter, the path controlling the issue, such as overvoltage, overcurrent, or overheating occurring in some battery modules of the battery pack will be described.

FIG. 3 is a diagram schematically illustrating a transfer path when thermal runaway occurs in some modules of the battery pack according to the exemplary embodiment of the present invention. FIG. 4 is an enlarged view of portion IV of FIG. 3. FIG. 5a and FIG. 5b are enlarged views of portion V of FIG. 3.

Referring to FIGS. 1 to 5b, when an abnormal phenomenon (thermal issue), such as overvoltage, overcurrent, or overheating, occur within the battery module 100, high-pressure venting gas is discharged from the inside of the battery module 100 through the venting gate 121. In this case, high-temperature and high-pressure gas and flame are guided to the first connection hole 324 located closest to the venting gate 121 of the battery module 100 in which the thermal issue occurs. The high-temperature and high-pressure gas and flame introduced through the first connection hole 324 may be discharged to the outside through the passage formed in the venting guiding frame 300.

For example, when the thermal issue occurs in the battery module 100 disposed at position No. 1 in FIG. 3, the high-pressure gas and flame may be discharged through the venting gate 121, and be directly guided to the rupture part 500 side via the passage 322 of the horizontal beam 320 and discharged to the outside as illustrated in FIG. 4. Through this, the thermal issue occurring in the battery module 100 at position No. 1 may be discharged to the outside without affecting the surrounding modules.

Further, when the thermal issue occurs in the battery module 100 disposed at position No. 2 in FIG. 3, the high-temperature and high-pressure gas and flame are discharged through the venting gate 121 and introduced to the passage 322 of the horizontal beam 320 as illustrated in FIGS. 5a and 5b. Subsequently, the high-temperature and high-pressure gas and flame introduced to the passage 312 of the vertical beam 310 through the second connection hole 314 and moving along the corresponding passage 312 may be guided to the horizontal beam 320 at the side at which the rupture part 500 is located through the second connection hole 314 formed at an end of an opposite side of the corresponding vertical beam 310 and finally discharged to the outside through the rupture part 500. That is, when the thermal issue occurs in the battery module 100, the high-temperature and high-pressure gas and flame may be guided to the passage of the venting guiding frame 300 through the first connection hole 324 that is located closest to the venting gate 121 of the corresponding battery module 100 and be finally discharged to the outside.

FIG. 6 is a perspective view illustrating the battery module included in the battery pack of FIG. 1. FIG. 7 is a perspective view of the battery module of FIG. 6 viewed from the bottom up in a z-axis direction. FIG. 8 is a perspective view of a battery cell included in the battery module of FIG. 6.

Referring to FIGS. 6 and 7, the battery module 100 included in the battery pack of FIG. 1 may include a battery cell stack 102 in which the plurality of battery cells 101 is stacked, and a module frame 108 and an end plate 120 accommodating the battery cell stack 102. The plurality of battery cells 101 is stacked so as to be electrically connected with each other to form the battery cell stack 102. Particularly, as illustrated in FIG. 6, the plurality of battery cells 101 may be stacked in a direction parallel to the y-axis.

In this case, the battery cell stack 102 according to the exemplary embodiment of the present invention may be a large-area module in which the number of battery cells 101 is larger than that of the related art. For example, 48 battery cells 101 may be included per battery module 100. In the case of the large-area module, a horizontal length of the battery module increases. Herein, the horizontal length may mean a length in the direction in which the battery cells 101 are stacked, that is, the direction parallel to the y-axis.

The module frame 108 accommodating the battery cell stack 102 may include an upper plate 112 and a lower frame 111. The lower frame 111 may be a U-shaped frame. The U-shaped frame may include a bottom portion, and two lateral portions extended upwards from both ends of the bottom portion. The bottom portion may cover the lower surface (an opposite direction of the z-axis) of the battery cell stack 102, and the lateral portions may cover both lateral surfaces (the y-axis direction and the opposite direction of the y-axis direction) of the battery cell stack 102.

The upper plate 112 may be formed in a single plate-shaped structure that surrounds the remaining upper surface (the z-axis direction) except for the lower surface and both lateral surfaces surrounded by the U-shaped frame. The upper plate 112 and the lower frame 111 are coupled by welding and the like in the state where the corresponding corner portions are in contact with each other to form the structure covering the battery cell stack 102 vertically and horizontally. The battery cell stack 102 may be physically protected through the upper plate 112 and the lower frame 111. To this end, the upper plate 112 and the lower frame 111 may be made of a metal material having predetermined strength.

In the end plate 120 according to the present exemplary embodiment, the venting gate 121 which communicates with the inside of the battery module 100 and is capable of discharging flame or heat generated in the battery module 100 may be formed as described above. The venting gate 121 may be formed at the lower side of the end plate 120 by considering a connector connection part for transmitting information.

The module frame 108 according to the present exemplary embodiment may include a module frame protruding portion 131 formed so that the bottom portion of the module frame 108 extends to pass through the end plate 120. In this case, a coolant introduced and discharged by a cooling port 140 connected with an upper surface portion of the module frame protruding portion 131 may be supplied to and discharged from a heat sink 130 through the module frame protruding portion 131.

Referring to FIG. 8, the battery cell 101 may be a pouch-type battery cell, and may be formed in a rectangular sheet-type structure. For example, the battery cell 101 according to the present exemplary embodiment has a structure in which two electrode leads 104 and 105 protrude from one end 114a and the other end 114b of the cell body 113, respectively, while facing each other. More particularly, the electrode leads 104 and 105 may be connected with an electrode assembly (not illustrated), and protrude to the outside of the battery cell 101 from the electrode assembly (not illustrated).

In the meantime, the battery cell 101 may be manufactured by bonding both ends 114a and 114b of the cell case 114 and one side portion 114c connecting both ends 114a and 114b in the state where the electrode assembly (not illustrated) is accommodated in the cell case 114. That is, the battery cell 101 according to the present exemplary embodiment has three seating portions 114*sa*, 114*sb*, and 114*sc* formed at a total of three points in the edge of the cell case 114, and the sealing portions 114*sa*, 114*sb*, and 114*sc* are the structures sealed by thermal fusion and the like, and the other side portion may be formed of the connection portion 115. The cell case 114 may be formed of a laminate sheet including a resin layer and a metal layer.

Further, the connection portion 115 may be elongated along one border of the battery cell 101, and a protrusion 101*p* of the battery cell 101 called a bat-ear may be formed at the end of the connection portion 115.

The battery cells 101 may be provided in plurality, and the plurality of battery cells 101 may be stacked so as to be electrically connected with each other to form the battery cell stack 102. As illustrated in FIG. 6, the plurality of battery cells 101 may be stacked in the direction parallel to the y-axis. Particularly, the battery cells 101 having the rectangular sheet-shaped structure may be arranged so that the cell bodies 113 are in contact with each other and stacked in the direction parallel to the y-axis. Accordingly, the electrode leads 104 and 105 may protrude in the direction vertical to the stack direction of the battery cells 101, that is, the x-axis direction and an opposite direction of the x-axis direction.

In the battery cell 101 according to the present exemplary embodiment, the sealing portions 114*sa*, 114*sb*, and 114*sc* formed at the edge of the cell case 114 may be formed with at least one venting guiding part 114V having a smaller width than an average width of the sealing portions 114*sa*, 114*sb*, and 114*sc*. The battery cell in the related art is designed so as to secure uniform sealing force by uniformly forming the width of the sealing portion. However, in this case, when an abnormal phenomenon occurs, it is difficult for the venting gas to be ejected to the same portion probabilistically. Accordingly, the venting gas ejected from the battery cell is sporadically discharged within the battery module. However, in the present exemplary embodiment, the venting guiding part 114V becomes the portion having the weakest sealing force, and may guide the venting gas to be ejected from the portion. However, the width of the venting guiding part 114V may have a value at a level to at least guarantee the sealing force. The venting guiding part 114V according to the present exemplary embodiment may be formed to be adjacent to the venting gate 121 formed in the battery module 100 of FIG. 6. In this case, when the abnormal phenomenon occurs in the battery cell 101, the venting gas may be better guided to the venting gate 121 by the foregoing disposition of the venting guiding part 114V. The venting gas guided to the venting gate 121 is controlled by the venting guiding frame 300 in the unit of the battery pack 1000 described with reference to FIGS. 1 and 2, thereby improving safety of the battery pack.

FIG. 9 is a schematic diagram illustrating a flow of venting gas when an abnormal phenomenon occurs in a battery pack according to a comparative example. FIG. 10 is a schematic diagram illustrating a flow of venting gas when an abnormal phenomenon occurs in the battery pack according to the exemplary embodiment of the present invention.

Referring to FIG. 9, a battery pack 20 in the related art does not include a system, such as the venting guiding part, the venting gate, and the venting guiding frame, according to the exemplary embodiments of the present invention, so that venting gas generated in the battery module 10 may be sporadically discharged.

Referring to FIG. 10, in the battery pack 1000 according to the present exemplary embodiment, when an abnormal phenomenon occurs in the first battery cell, the venting gas inside the battery pack 1000 is controlled by the system in which venting gas is discharged from the battery cell 101 by the venting guiding part 114V illustrated in FIG. 8 and the venting gas inside the battery module 100 is discharged to the outside of the battery module 100 through the venting gate 121, and the venting gas is guided by being lined in each unit by the venting guiding frame 300 including one pair of vertical beams 310 and one pair of horizontal beams 320, thereby improving safety.

The battery module and the battery pack including the same described above may be applied to various devices. As the device, transport means, such as an electric bicycle, an electric vehicle, and a hybrid vehicle, are applicable, but the present invention is not limited thereto, and the present invention is applicable to various devices capable of using a battery module and a battery pack including the same, which also belongs to the scope of the present invention.

Although an exemplary embodiment of the present invention has been described in detail, the scope of the present invention is not limited by the embodiment. Various changes and modifications using the basic concept of the present invention defined in the accompanying claims by those skilled in the art shall be construed to belong to the scope of the present invention.

EXPLANATION OF REFERENCE NUMERALS

114V: Venting guiding part
121: Venting gate
200: Pack tray
300: Venting guiding frame
310: Vertical beam
320: Horizontal beam
311: Cover of vertical beam
312: Passage of vertical beam
321: Cover of horizontal beam
322: Passage of horizontal beam
324: First connection hole
314: Second connection hole
326: Third connection hole
400: Housing
500: Rupture part

The invention claimed is:

1. A battery pack, comprising:
  a plurality of battery modules;
  a venting guiding frame disposed along an edge of the plurality of battery modules so that the plurality of battery modules are within the venting guiding frame; and
  a housing which accommodates the plurality of battery modules and the venting guiding frame,
  wherein the battery module includes a battery cell stack in which the plurality of battery cells is stacked and a module frame accommodating the battery cell stack,
  wherein each battery cell of the plurality of battery cells includes an electrode assembly and a cell case accommodating the electrode assembly, and
  wherein a sealing portion is formed at an edge of the cell case, and at least one venting guide having a smaller width than an average width of the sealing portion is formed in the sealing portion.

2. The battery pack of claim 1, wherein:
  the battery module further includes:
  end plates which respectively cover the battery cell stack exposed from a front surface and a rear surface of the module frame; and at least one venting gate communicating with an inside of the battery module in the end plate.

3. The battery pack of claim 2, wherein:
the venting guide is adjacent to the venting gate.

4. The battery pack of claim 2, wherein:
the venting guiding frame includes one pair of vertical beams formed to be parallel to a first direction and one pair of horizontal beams formed to be parallel to a second direction crossing the first direction, and
wherein each of the vertical beams and the horizontal beams has a tubular shape and includes a cover formed in a longitudinal direction of the vertical beam and the horizontal beam, and a passage surrounded by the cover to allow gas to pass through.

5. The battery pack of claim 4, wherein:
the cover of the horizontal beam includes at least one first connection hole facing the battery module, and
wherein the venting gate is formed so that a tubular shape of the venting gate communicates with a tubular shape of the horizontal beam while facing the first connection hole.

6. The battery pack of claim 5, further comprising: a second connection hole communicating with a passage of the other of the vertical beam and the horizontal beam in the cover of any one of the vertical beam and the horizontal beam.

7. The battery pack of claim 6, further comprising:
at least one rupture part connected with the passage at an external side of any one of the horizontal beam and the vertical beam.

8. The battery pack of claim 7, wherein:
the housing includes a lower housing including a bottom surface on which the plurality of battery modules is disposed and a lateral wall extended upwards from the bottom surface, and an upper cover covering an opening of an upper portion of the lower housing, and
wherein the rupture part is coupled with the horizontal beam or the vertical beam with the lateral wall of the lower housing interposed therebetween.

9. The battery pack of claim 6, wherein:
the venting gate, the first connection hole, the passage of the horizontal beam, and the second connection hole, and the passage of the vertical beam are connected by one path.

10. The battery pack of claim 1, wherein the venting guiding frame is between the housing and the plurality of battery modules.

11. The battery pack of claim 1, wherein each of the plurality of battery modules has a vent communicating with the venting guiding frame.

12. A device comprising the battery pack of claim 1.

* * * * *